United States Patent
Miyake et al.

(10) Patent No.: US 12,511,957 B2
(45) Date of Patent: Dec. 30, 2025

(54) WORK VEHICLE, PROGRAM, RECORDING MEDIUM, AND METHOD

(71) Applicant: KUBOTA CORPORATION, Osaka (JP)

(72) Inventors: Hiroshi Miyake, Sakai (JP); Akiya Shibutani, Sakai (JP); Norita Tottori, Sakai (JP); Tsuyoshi Gono, Sakai (JP); Keiji Takahashi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 172 days.

(21) Appl. No.: 18/282,604

(22) PCT Filed: Nov. 1, 2021

(86) PCT No.: PCT/JP2021/040239
§ 371 (c)(1),
(2) Date: Sep. 18, 2023

(87) PCT Pub. No.: WO2022/195948
PCT Pub. Date: Sep. 22, 2022

(65) Prior Publication Data
US 2024/0169773 A1 May 23, 2024

(30) Foreign Application Priority Data
Mar. 16, 2021 (JP) ................................. 2021-042721

(51) Int. Cl.
*B60R 16/033* (2006.01)
*G01R 19/165* (2006.01)
(Continued)

(52) U.S. Cl.
CPC .......... *G07C 5/0825* (2013.01); *B60R 16/033* (2013.01); *G01R 19/16542* (2013.01); *G01R 31/3835* (2019.01); *H02J 7/14* (2013.01)

(58) Field of Classification Search
CPC ..... G07C 5/0825; B60R 16/033; B60R 16/04; G01R 19/16542; G01R 31/3835;
(Continued)

(56) References Cited

U.S. PATENT DOCUMENTS

| 2007/0120694 A1* | 5/2007 | Lindsey | G01R 19/16538 340/662 |
| 2011/0208410 A1* | 8/2011 | Izumoto | F02D 17/04 701/112 |

(Continued)

FOREIGN PATENT DOCUMENTS

| JP | 59-204430 A | 11/1984 |
| JP | 2000329040 A | 11/2000 |

(Continued)

OTHER PUBLICATIONS

Official Communication issued in International Patent Application No. PCT/JP2021/040239, mailed on Jan. 18, 2022.

*Primary Examiner* — Lincoln D Donovan
*Assistant Examiner* — Alex W Lam
(74) *Attorney, Agent, or Firm* — Keating & Bennett, LLP

(57) ABSTRACT

A work vehicle includes a battery, an operating apparatus to be supplied with power from the battery, an operating apparatus manager to manage operation of the operating apparatus, a reporting device in a driver's section, a voltage drop amount detector to detect an amount of voltage drop in the battery, and a voltage drop manager to report voltage drop information via the reporting device in response to the amount of voltage drop exceeding a permissible value during operation of the operating apparatus.

14 Claims, 6 Drawing Sheets

(51) Int. Cl.
*G01R 31/3835* (2019.01)
*G07C 5/08* (2006.01)
*H02J 7/14* (2006.01)

(58) Field of Classification Search
CPC ....... G01R 31/006; G01R 31/371; H02J 7/14; H02J 2310/48; H02J 7/0047; B60L 58/14; B60L 2200/40; B60L 2250/10; B60L 2250/16; B60L 1/003; B60L 3/0046; B60L 3/12; B60K 35/00; B60K 35/28; B60Y 2400/90
See application file for complete search history.

(56) References Cited

U.S. PATENT DOCUMENTS

| | | | | |
|---|---|---|---|---|
| 2014/0303818 A1* | 10/2014 | Aoki | ................. | B60W 20/15 903/903 |
| 2022/0042486 A1* | 2/2022 | Asai | ................. | B60R 16/033 |

FOREIGN PATENT DOCUMENTS

| | | |
|---|---|---|
| JP | 2002-283936 A | 10/2002 |
| JP | 2004276672 A | 10/2004 |
| JP | 2011-153962 A | 8/2011 |
| JP | 2018080646 A | 5/2018 |
| JP | 2020125625 A | 8/2020 |
| JP | 2021026641 A | 2/2021 |
| KR | 19980020805 A | 6/1998 |
| KR | 20040088259 A | 10/2004 |
| KR | 20080110196 A | 12/2008 |

* cited by examiner

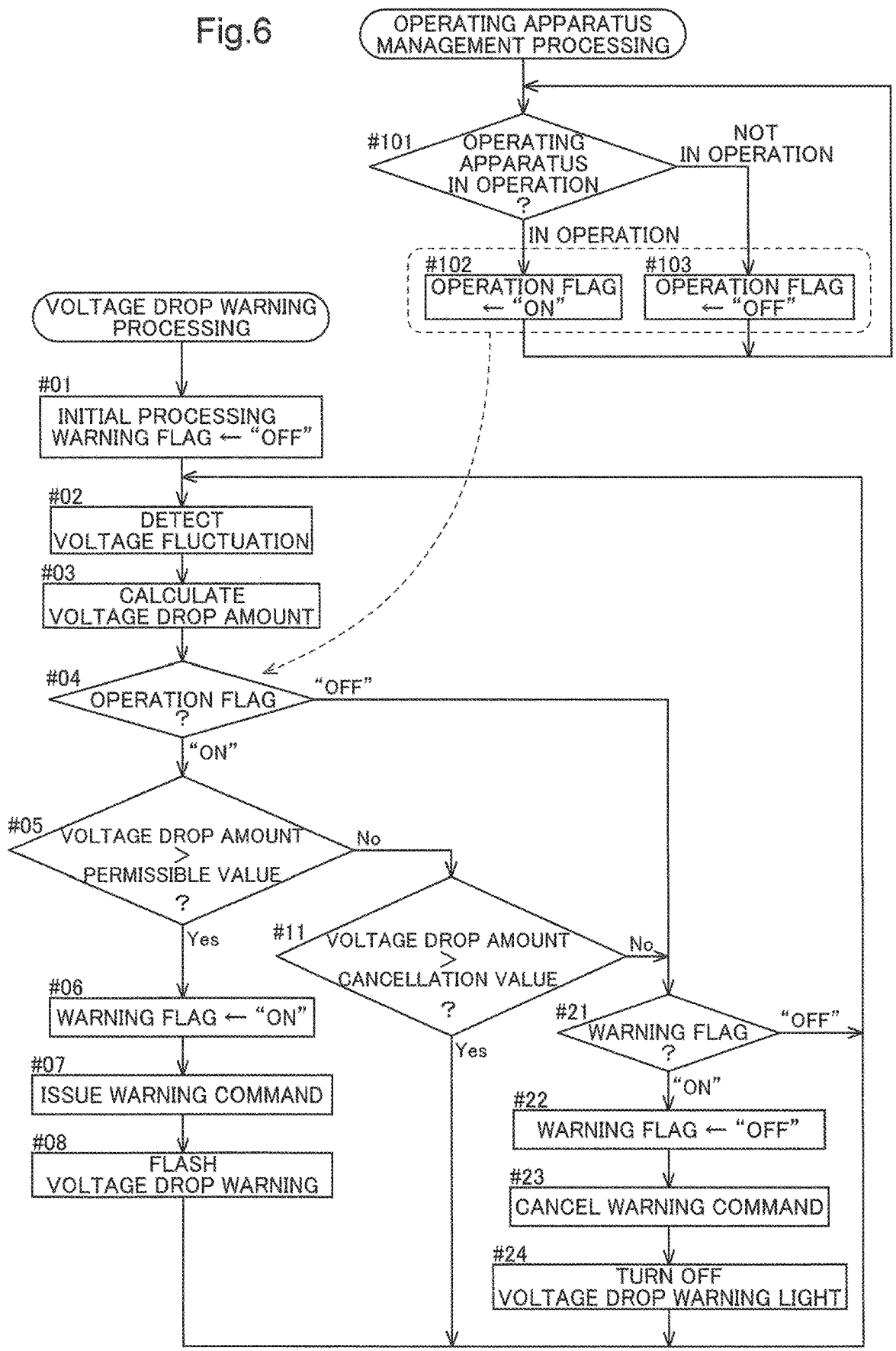

WORK VEHICLE, PROGRAM, RECORDING MEDIUM, AND METHOD

BACKGROUND OF THE INVENTION

1. Field of the Invention

The present invention relates to a work vehicle including a battery and an operating apparatus to operate based on power supplied by the battery, and capable of reporting a state of the battery to a driver.

The present invention also relates to a program, a non-transitory recording medium containing the program, and a method.

2. Description of the Related Art

JP 2011-153962A discloses a tractor including a work apparatus for agricultural work. This tractor includes an output device that operates based on the driver's operation, a battery monitoring unit that measures the capacity of the battery that serves as a power source for the output device, and a control unit that transmits information regarding the capacity of the battery. When it is determined, based on information regarding the battery capacity, that the battery capacity has dropped to less than or equal to a predetermined level, the driver is informed by a display on a display unit that the battery capacity has dropped to less than or equal to the predetermined level.

JP 2002-283936A discloses an apparatus for an automobile, which determines the state of fatigue of a battery based on the voltage difference between the voltage when the voltage of the battery drops instantaneously due to an electrical load and the average voltage of the battery, and informs the driver of the state of fatigue of the battery. Normally, the relative value of the average battery voltage is displayed with the use of LEDs, and when a differential voltage of 0.5 volts or more occurs within 0.1 seconds, the relative value of the differential voltage is displayed with the use of the LEDs.

SUMMARY OF THE INVENTION

With the tractor according to JP 2011-153962A, the driver is informed when the battery capacity has dropped to less than or equal to the predetermined level, so that the driver can take actions such as charging the battery. However, if battery charging or battery replacement is performed in the middle of the work, the work will be delayed significantly. Therefore, there is demand for a control that constantly monitors the battery so that actions such as charging or replacing the battery can be taken at the right time and can be performed by changing the use pattern of the work apparatus before the battery capacity drops to less than or equal to a predetermined level.

With the apparatus according to JP 2002-283936A, the driver is informed of the average voltage of the battery, the voltage when the battery voltage drops instantaneously due to the electric load, and the differential voltage. However, if the driver is only informed of a battery voltage drop by the emission of LEDs, it is difficult for the driver to ascertain the cause of the battery voltage drop.

Preferred embodiments of the present invention provide work vehicles that each enables a driver to appropriately grasp a state of a battery during work and take actions such as charging or replacing the battery in an appropriate manner.

A work vehicle according to a preferred embodiment of the present invention includes a battery and an operating apparatus to be supplied with power from the battery. Furthermore, the work vehicle includes a reporting device in a driver's section, a voltage drop amount detector to detect an amount of voltage drop in the battery, and a voltage drop manager to report voltage drop information via the reporting device in response to the amount of voltage drop exceeding a permissible value during operation of the operating apparatus.

With this configuration, the amount of voltage drop in the battery is monitored when an operating apparatus with high power consumption is operated by the driver, and when the voltage drop exceeds a permissible value, voltage drop information is reported to the driver via the reporting device. This allows the driver to see what kind of operation of the operating apparatus will cause a voltage drop greater than the permissible value in the battery. If such a voltage drop occurs, it is possible to continue work travel while avoiding the corresponding operations as much as possible, and furthermore, it is possible to take measures such as charging or replacing the battery at the right time or at the right place. Note that examples of operating apparatuses include an apparatus that is directly attached to the body of the work vehicle via a coupling mechanism, and another apparatus that is supplied with power from the battery.

Work vehicles often travel in poor environmental conditions for electrical systems, such as paddy fields and muddy areas. To maintain accurate measurements, the voltage drop detector needs to be protected from water and mud. However, adopting a special protective structure for the voltage drop detector is costly. To solve this problem, it is preferable to install the voltage drop detector in an electronic control unit of the work vehicle, as the electronic control unit on the work vehicle is protected from water and mud by protective measures. Many electronic control units have a built-in power supply circuit that produces a highly accurate voltage, and it is therefore preferable to use the voltage from this power supply circuit for the voltage drop detector. Therefore, in a preferred embodiment, the voltage drop amount detector is installed in an electronic control unit to be supplied power from the battery, and is configured to detect the amount of voltage drop based on a detection signal from a voltage detector connected to a power feed line of the battery.

It is preferable to use visual stimuli to reliably inform the driver during a work travel that a battery voltage drop greater than the permissible value has occurred, as the information is not disturbed by noise or the like. Therefore, in a preferred embodiment, the reporting device is a single voltage drop warning light, and the voltage drop information is reported by flashing of the voltage drop warning light.

During work travel, the driver looks at the instrument panel, which displays a variety of travel and work information. Therefore, it is preferable that the voltage drop warning light is disposed in the instrument panel or around the instrument panel. Furthermore, the use of the various warning lights located in the instrument panel, particularly the battery warning light, as a voltage drop warning light is advantageous in terms of space and cost. The battery warning light, as is well known, is turned on when an inconvenience to the battery such as an alternator fault or faulty wiring occurs. The mode in which this battery warning light flashes instead of illuminating to report a voltage drop in the battery to the driver is also preferable for the driver. Therefore, in a preferred embodiment of the present invention, the work vehicle further includes a battery warning light on an instrument panel that is disposed in the driver's section, and the battery warning light is usable as the voltage drop warning light.

The voltage drop during operation of the operating apparatus varies over time, and therefore there are cases where the voltage drop in the battery momentarily exceeds the permissible value. Such a momentary voltage drop does not greatly affect the battery, and there is no need to report it to the driver. In addition, there are cases where the battery voltage drop exceeding the permissible value and the recovery of the battery voltage occur repeatedly. In such cases, even if the battery voltage momentarily recovers, it will drop again, so it is better not to stop reporting it immediately. To address the former cases, it is preferable that the voltage drop manager is operable to report the voltage drop information in response to the amount of voltage drop continuously exceeding the permissible value for a predetermined period of time. To address the latter cases, it is preferable that the reporting of the voltage drop information is cancelled in response to the amount of voltage drop returning to a cancellation value less than the permissible value, i.e., controlled hysteresis is provided for the detection of the voltage drop and the detection of the voltage recovery.

In a preferred embodiment of the present invention, the operating apparatus is operable on power supplied by the battery. An operating apparatus that depends on the power supplied by the battery for its operating energy consumes a lot of power during operation. Therefore, it is important to check the voltage drop during operation of the operating apparatus. In addition, even an operating apparatus that operates on rotational power from an engine has components that require power from the battery, and it is therefore necessary to check the voltage drop during the operation of such an operating apparatus.

In order to carefully check the voltage drop during operation of the operating apparatus, it is necessary to perform operating apparatus management to carefully manage the operation of the operating apparatus. Therefore, in a preferred embodiment of the present invention, the work vehicle includes an operating apparatus manager to manage operation of the operating apparatus.

In a preferred embodiment of the present invention, the work vehicle includes an external power feed port connected to the battery. In work vehicles including an external power feed port, various electrical devices other than the above-mentioned operating apparatuses (e.g., implements) can be connected to the external power feed port as external devices, so that the work vehicle can carry out various tasks. In such cases, it is still possible to check the voltage drop during operation of the electrical device connected to the external power feed port.

In a preferred embodiment of the present invention, the operating apparatus includes a motor operable on power supplied by the battery. In such a configuration, it is possible to check the voltage drop that may occur depending on the operational state of the motor in the operating apparatus (e.g. implement), and therefore it is possible to prevent or reduce damage to the battery while allowing the motor to operate.

Work vehicles including an operating apparatus with high power consumption have the function of charging the battery with the use of rotational power from the engine. However, the battery cannot be charged sufficiently or at all at low engine speeds below the rated engine speed, at idle speeds, or when the engine is stopped. However, even in preferred embodiments in which the operating apparatus can be operated when the work vehicle is stopped (including when the rotation of the engine is stopped) and when the work vehicle is travelling at low speed (including when the engine is idling), i.e., preferred embodiments in which the operating apparatus can be operated at a reduced engine speed to perform an operation other than normal work of the work vehicle, the present invention makes it possible to operate such an operating apparatus while preventing or reducing damage to the battery by checking the voltage drop during operation of the operating apparatus.

In a preferred embodiment of the present invention, the work vehicle further includes an alternator to supply power to the battery and the operating apparatus via a cable and including a current protector to provide current protection in a power supply path, wherein a voltage drop warning light serving as the reporting device is operable to issue a warning in response to an abnormality occurring in the cable or the current protector. With this configuration, a voltage drop check according to a preferred embodiment of the present invention makes it possible not only to detect faults of the alternator, but also to estimate the blowing of a fuse serving as a current protector and the disconnection of a cable, which cannot be detected by conventional work vehicles. This means that it is possible to (virtually) detect alternator-related faults in advance.

A program according to a preferred embodiment of the present invention is a program for a work vehicle including a battery, an operating apparatus to be supplied with power from the battery, and a reporting device in a driver's section, the program enabling a computer to realize a voltage drop amount detecting function of detecting an amount of voltage drop in the battery, and a voltage drop managing function of reporting voltage drop information via the reporting device in response to the amount of voltage drop exceeding a permissible value during operation of the operating apparatus.

A non-transitory recording medium according to a preferred embodiment of the present invention is a recording medium having recorded thereon a program for a work vehicle including a battery, an operating apparatus to be supplied with power from the battery, and a reporting device in a driver's section, the program enabling a computer to realize a voltage drop amount detecting function of detecting an amount of voltage drop in the battery, and a voltage drop managing function of reporting voltage drop information via the reporting device in response to the amount of voltage drop exceeding a permissible value during operation of the operating apparatus.

A method according to a preferred embodiment of the present invention is a method for a work vehicle including a battery, an operating apparatus to be supplied with power from the battery, and a reporting device in a driver's section, the method including a voltage drop amount detecting step of detecting an amount of voltage drop in the battery, and a voltage drop managing step of reporting voltage drop information via the reporting device in response to the amount of voltage drop exceeding a permissible value during operation of the operating apparatus.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a flowchart showing an example of processing that is performed to report a voltage drop greater than a permissible value of the battery during operation of an operating apparatus or an external device.

DETAILED DESCRIPTION OF THE PREFERRED EMBODIMENTS

Work vehicles according to preferred embodiments of the present invention are operable to report a battery voltage drop to a driver. Hereinafter, work vehicles according to preferred embodiments of the present invention will be described, where a tractor is used as an example.

Figure 1:
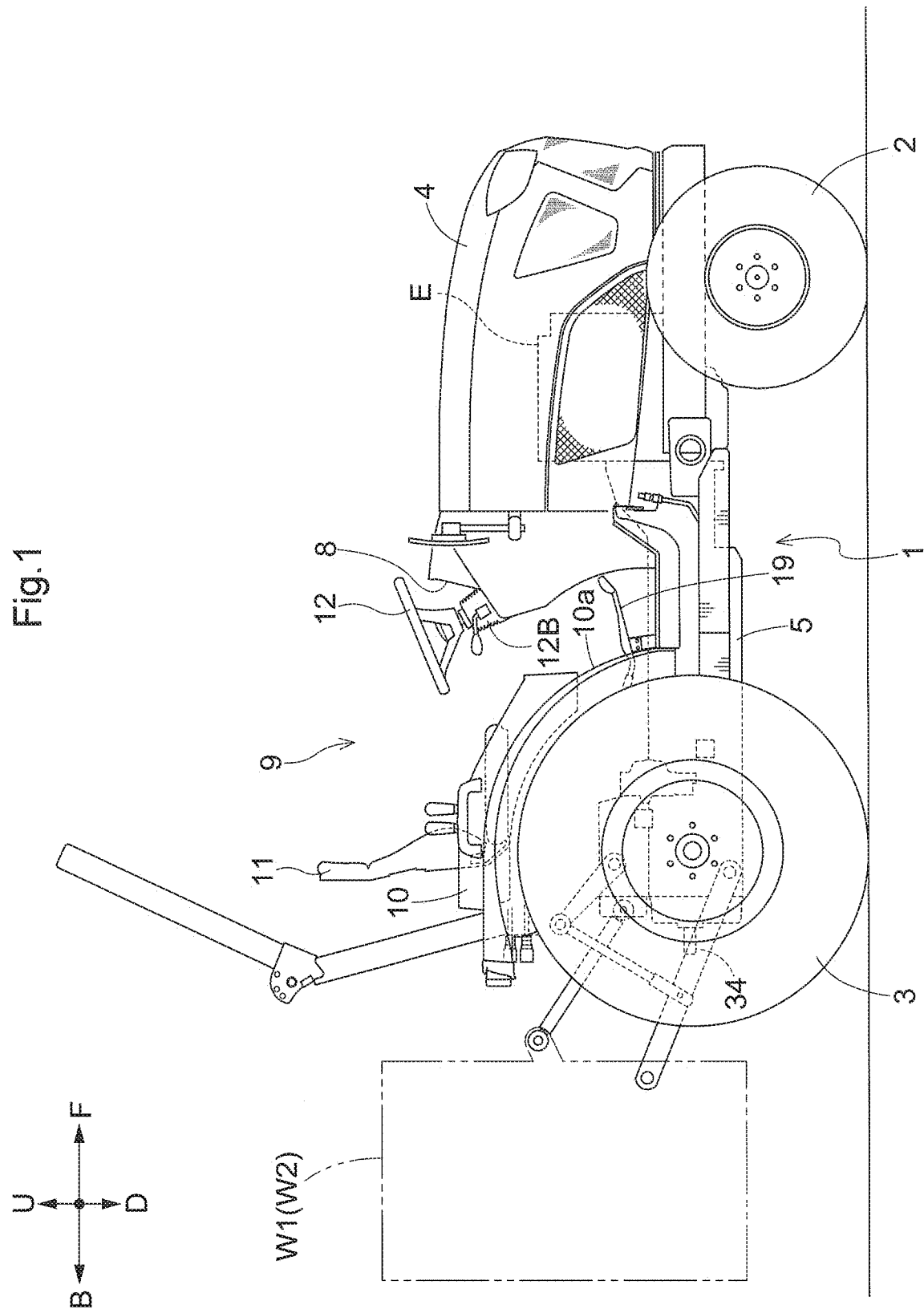
FIG. 1 is a side view of a tractor, which is an example of a work vehicle.
Figure 2:
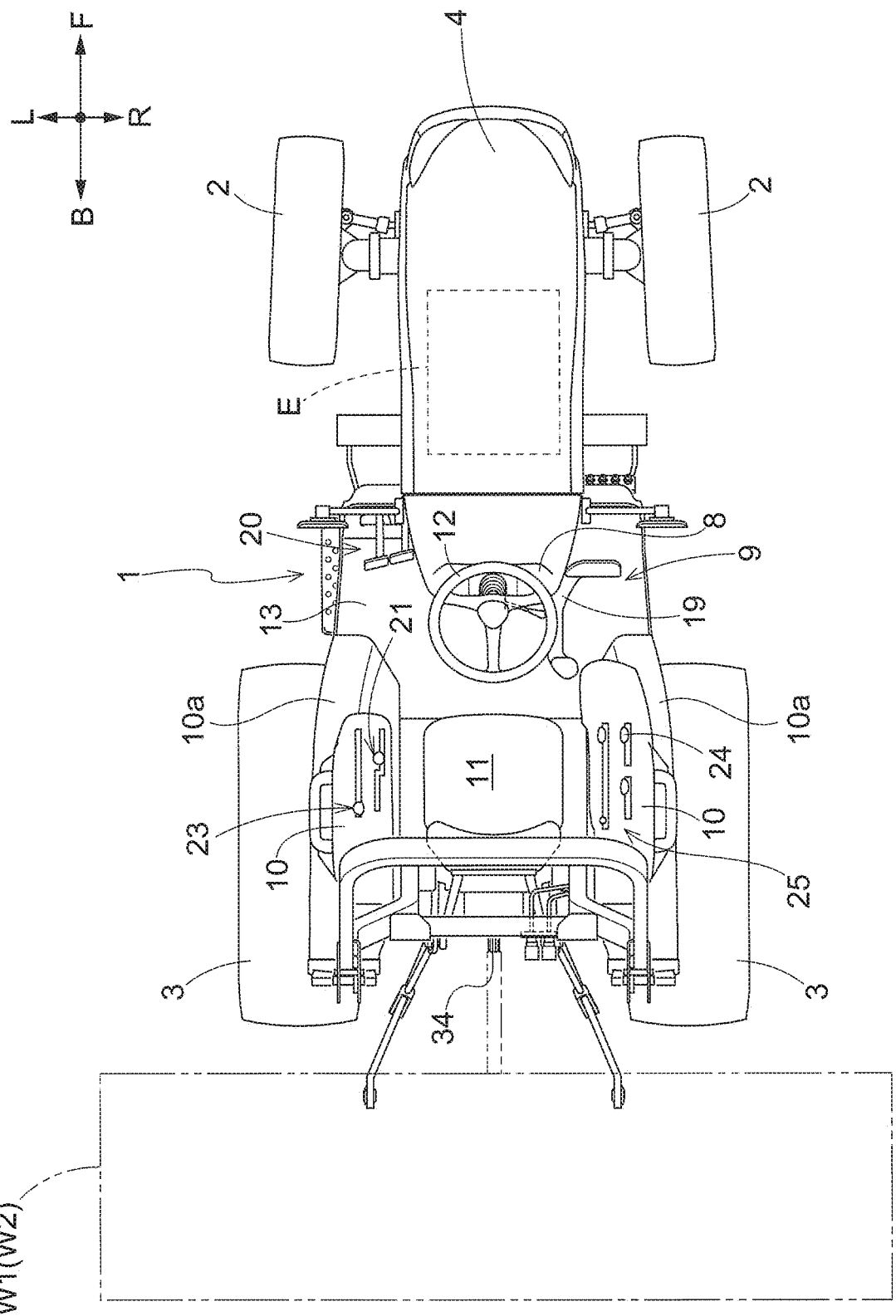
FIG. 2 is a plan view of the tractor.

FIG. 1 is a side view of the tractor, and FIG. 2 is a plan view of the tractor. In the following description, with respect to the tractor, the direction indicated by an arrow F shown in FIGS. 1 and 2 is a "forward direction", the direction indicated by an arrow B is a "rearward direction", the direction indicated by an arrow U is an "upward direction", the direction indicated by an arrow D is a "downward direction", the direction indicated by an arrow L is a "direction to the left", and the direction indicated by an arrow R is a "direction to the right".

In the tractor, left and right front wheels 2 and left and right rear wheels 3 are disposed on a body 1, an engine E is disposed inward of an engine hood 4 of a front portion of the body 1, and a driver's section 9 is disposed in a rear portion of the body 1. This tractor includes an operating apparatus W1 (represented as virtual lines in FIGS. 1 and 2) that requires power supply at a position rearward of the body 1, examples of which include an implement of any kind, such as a rotary, an electric implement such as a motor, a water supply apparatus, and a fertilizer supply apparatus. The tractor may be including an external device W2 instead of or together with the operating apparatus W1.

In the tractor, a transmission 5 that shifts the driving force of the engine E is disposed in the area extending from a central portion of the body 1 in the front-rear direction to a rear portion of the body 1. In addition, an external power take-off (PTO) shaft 34 to transmit engine power to the operating apparatus W1 requiring engine power is disposed at the rear end of the transmission 5 so as to protrude rearward.

In the driver's section 9, for example, a driver's seat 11 on which the driver sits is disposed at an intermediate position between left and right rear wheel fenders 10a that respectively include lever guides 10 on the upper surfaces thereof, and a steering wheel 12 that is used to steer the body 1 is disposed forward of the driver's seat 11. A floor 13 is disposed in the driver's section 9, and the floor 13 includes a main shift pedal 19. The lever guide 10 on the upper surface of the rear wheel fender 10a on the left of the driver's seat 11 includes a main shift lever 21 and an auxiliary shift lever 23 that protrude upward from the lever guide 10 and are arranged side by side.

The lever guide 10 on the upper surface of the rear wheel fender 10a on the right of the driver's seat 11 includes a speed shift lever 24 that is used to change the driving speed of the operating apparatus W1, so as to protrude upward from the lever guide 10. Two brake pedals 20 capable of stopping the body 1 are disposed on the floor 13 side by side when viewed forward (along the width direction of the body 1). These two brake pedals 20 on the left and right sides are independent of each other, and are configured so that the driver can apply the brake to the left rear wheel 3 by depressing the left brake pedal 20, and can apply the brake to the right rear wheel 3 of the tractor by depressing the right brake pedal 20.

Furthermore, an operating apparatus manipulation tool group 25, which is a group of operating apparatus manipulation tools other than the speed shift lever 24 used to manipulate the operating apparatus W1 and the external device W2, is disposed around the driver's seat 11. The operating apparatus manipulation tool group 25 may not only be disposed in the body 1, but may also be configured as a remote control. The operating apparatus manipulation tool group 25 also includes single manipulation tools such as a single lever and a single switch.

Figure 3:
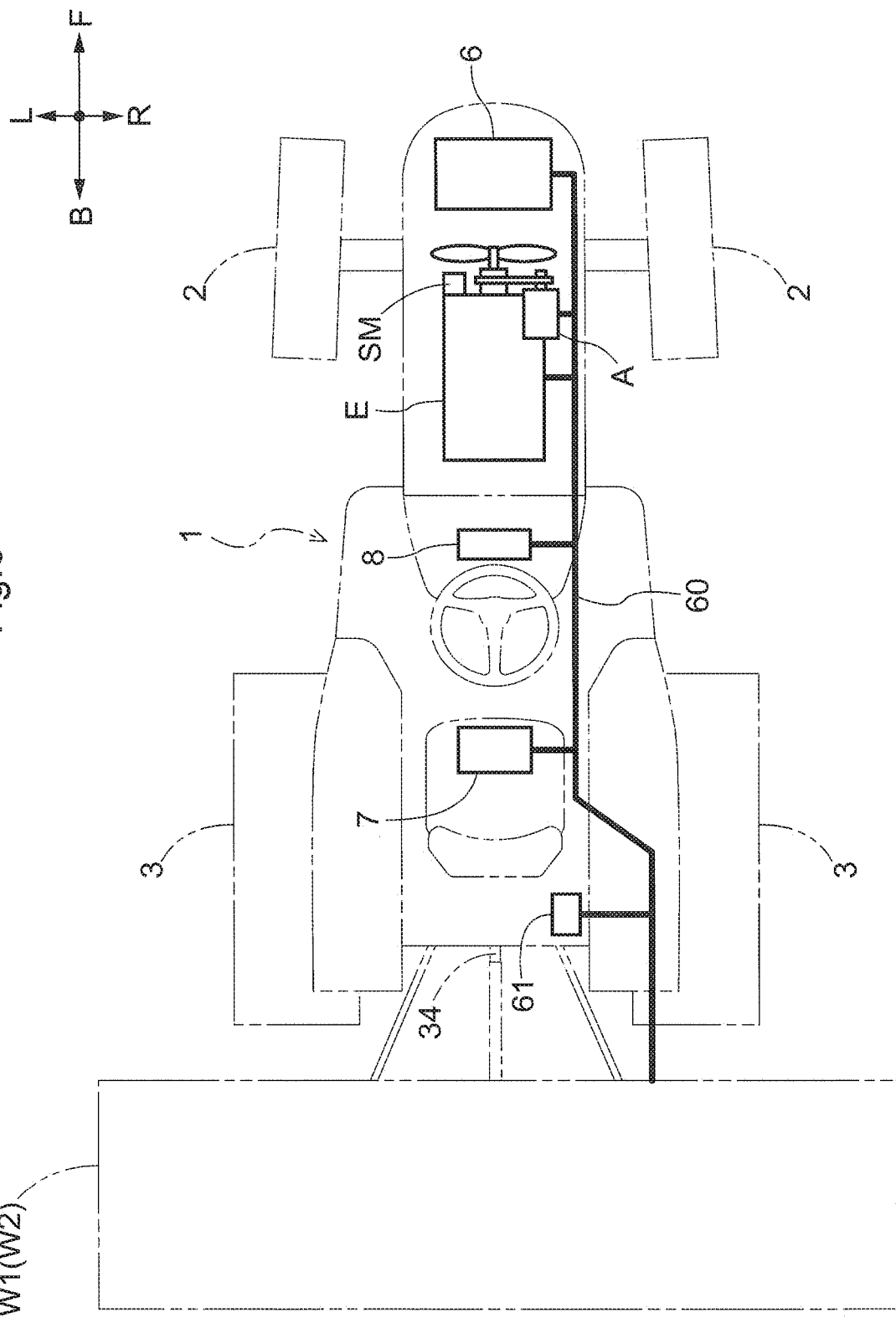
FIG. 3 is a plan view schematically showing the arrangement of a battery and battery-related devices.

Next, the power supply system of this tractor will be described with reference to FIG. 3. In a front area of the body 1, a battery 6 is disposed forward of the engine E. A starter SM or an alternator A are disposed on a front portion of the engine E. An instrument panel 8 is disposed forward of the driver's seat 11, and an electronic control unit 7 is disposed below the driver's seat 11. Furthermore, an external power feed port 61, which is a power feed socket, is disposed in a rear portion of the body 1. If the external power feed port 61 is configured to feed a current of a predetermined voltage (for example, about 100V), a general-purpose electric device can be connected to this external power feed port 61 and used as the external device W2. Note that, if the operating apparatus W1 used exclusively for this tractor requires power supply, the operating apparatus W1 is connected to a power feed line 60, which is a cable connected to the battery 6, with the use of a dedicated connector. The battery 6, the engine E, the starter SM, the alternator A, the instrument panel 8, the electronic control unit 7, the external power feed port 61, and, in addition, other electrical devices not shown in the drawings are connected to the power feed line 60. In FIG. 3, the power feed line 60 extends substantially straight on the right of the body 1. In this way, the configuration in which the power feed line 60 extends straight on either the right or left of the body 1 is advantageous from the viewpoint of installation and maintenance of the power feed line 60.

The battery 6 is charged with power generated by the alternator A. The engine E, the starter SM, the alternator A, the instrument panel 8, the electronic control unit 7, the external device W2 connected to the external power feed port 61, and the operating apparatus W1 connected to the power feed line 60 are supplied with power generated by the alternator A. If alternator A is stopped, or if the amount of power generated by the alternator A is less than the demand, power is supplied by the battery 6.

Figure 4:
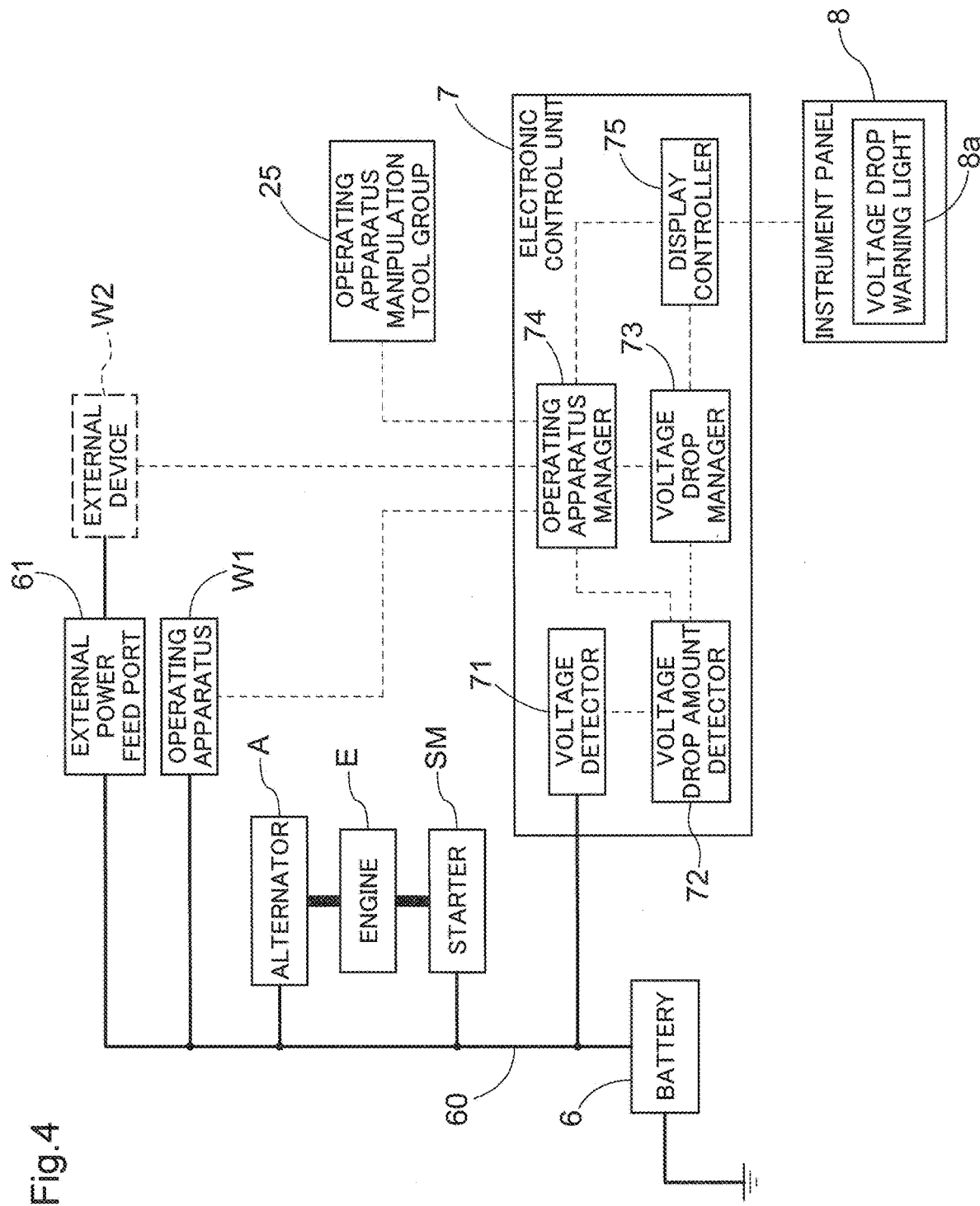
FIG. 4 is a functional block diagram showing functions related to the reporting of a battery voltage drop.

FIG. 4 shows a functional block of the electronic control unit 7 that detects and reports the state of the battery 6. In this preferred embodiment, the electronic control unit 7 includes a voltage detector 71, a voltage drop amount detector 72, a voltage drop manager 73, an operating apparatus manager 74, and a display controller 75.

The operating apparatus manager 74 manages the operational states of the operating apparatus W1 mounted on the tractor and the external device W2 connected to the external power feed port 61. In this preferred embodiment, the external device W2 is treated as equivalent to the operating apparatus W1. Therefore, the operating apparatus manager 74 receives operation signals input from the operating apparatus manipulation tool group 25 to manipulate the operating apparatus W1 and the external device W2, and a dedicated remote control. The voltage drop manager 73 sets the operation flag to "ON", which indicates that the operating apparatus W1 or external device W2 is in operation, based on the input operation signal.

The voltage detector 71 is an electrical circuit connected to the power feed line 60, and detects voltage fluctuations in the power feed line 60. The voltage fluctuation detection signal detected by the voltage detector 71 is transmitted to the voltage drop amount detector 72. The voltage drop amount detector 72 detects (calculates) the amount of voltage drop in the battery 6 based on the voltage fluctuation detection signal transmitted from the voltage detector 71.

While the operating apparatus W1 or the external device W2 is in operation, i.e., while the voltage drop manager 73 includes an operation flag "ON" from the operating apparatus manager 74, if the amount of voltage drop detected by the voltage drop amount detector 72 exceeds a permissible value, the voltage drop manager 73 creates voltage drop information indicating the state of the voltage drop. If the voltage drop information includes a voltage drop warning command, this voltage drop warning command is provided to the display controller 75. Based on the received voltage drop warning command, the display controller 75 controls the instrument panel 8, which is one form of the reporting device, to issue a voltage drop warning.

The voltage drop manager 73 has either one or both of a first mode and a second mode as the mode for issuing a voltage drop warning command. In the first mode, the voltage drop manager 73 provides a voltage drop warning command to the display controller 75 when the amount of voltage drop exceeds the permissible value even momentarily. In the second mode, the voltage drop manager 73 does not provide a voltage drop warning command to the display controller 75 when the amount of voltage drop momentarily exceeds the permissible value, but provides a voltage drop warning command to the display controller 75 when the amount of voltage drop continuously exceeds the permissible value for a predetermined period of time. In addition, this voltage drop warning is cancelled when the amount of voltage drop returns to a cancellation value, which is a value lower than the permissible value. In other words, the reporting and cancellation of the voltage drop warning is performed with controlled hysteresis. Of course, this controlled hysteresis is not essential, and the reporting of the voltage drop warning may be cancelled without hysteresis.

Figure 5:
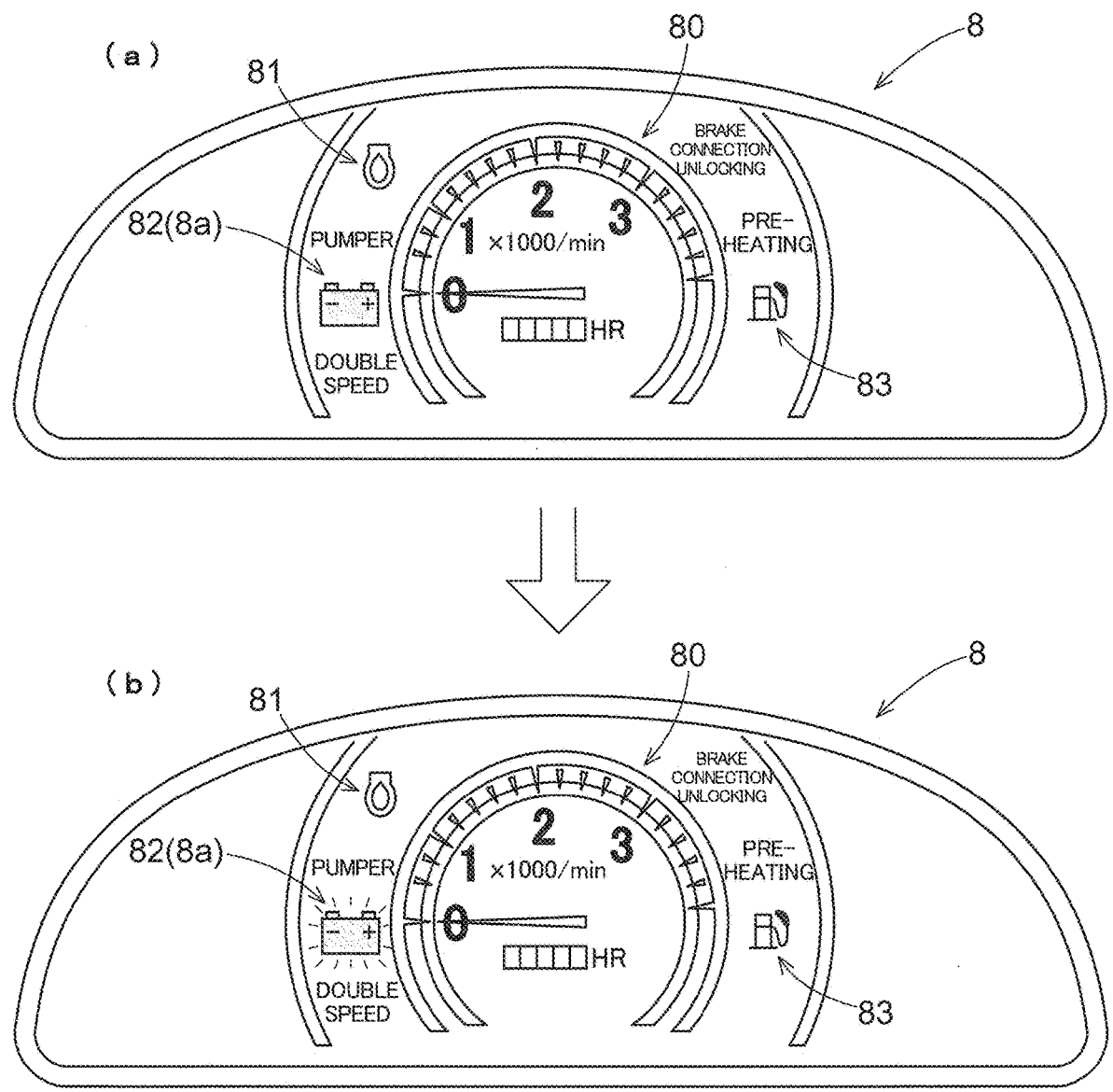
FIG. 5 is a front view of an instrument panel.

FIG. 5 shows an example of the instrument panel 8. The instrument panel 8 may be built into the front panel that is disposed forward of the driver's section 9. This instrument panel 8 has general specifications, with an engine tachometer 80, an engine oil pressure warning light 81, a battery warning light 82, a fuel level gauge 83, and so on arranged therein. The display of the instrument panel 8 is controlled by the display controller 75.

In this preferred embodiment, the battery warning light 82 is also used as a voltage drop warning light 8a to report that the voltage drop in the battery 6 exceeds the permissible value. When the display controller 75 receives a voltage drop warning command from the voltage drop manager 73, the display controller 75 flashes the battery warning light 82, i.e., the voltage drop warning light 8a. That is to say, the battery warning light 82 illuminates when a charging fault occurs in the battery 6 (see (a) in FIG. 5), and flashes when the voltage drop exceeds the permissible value of the battery 6 (see (b) in FIG. 5).

FIG. 6 is a flowchart showing an example of processing that is performed to report a voltage drop exceeding the permissible value of the battery 6 during operation of the operating apparatus W1 and the external device W2. When the tractor is driven, voltage drop warning processing and operating apparatus management processing start.

In operating apparatus management processing, the operating apparatus manager 74 checks whether the operating apparatus W1 (or the external device W2) is in operation or not in operation (#101). If it is in operation (the "IN OPERATION" branch in #101), "ON" is set to the operation flag (#102), and if it is not in operation (the "NOT IN OPERATION" branch in #101), "OFF" is set to the operation flag (#103). The content of the operation flag is referred to in voltage drop warning processing.

In voltage drop warning processing, "OFF" is set to a warning flag in initial processing (#01). When main processing is started, voltage fluctuations in the battery 6 are detected by the voltage detector 71 (#02). Furthermore, based on the value detected by the voltage detector 71, the voltage drop amount detector 72 calculates the amount of voltage drop in the battery 6 (#03). Next, the content of the operation flag is checked (#04).

If the check in step #04 indicates that the content of the operation flag is "ON" (the "ON" branch in #04), it is further checked whether or not the amount of voltage drop is greater than the permissible value (#05). If the amount of voltage drop is greater than the permissible value (the "Yes" branch in #05), "ON" is set to the warning flag by the voltage drop manager 73 (#06) and a voltage drop warning command is created as voltage drop information and issued to the display controller 75 (#07). Upon receiving the voltage drop warning command, the display controller 75 flashes the battery warning light 82 functioning as the voltage drop warning light 8a (#08). Thereafter, processing returns to step #02.

If the check in step #05 indicates that the amount of voltage drop is not greater than the permissible value (the "No" branch in #05), it is further checked whether or not the amount of voltage drop is greater than a cancellation value (a value smaller than the permissible value) (#11). If the amount of voltage drop is greater than the cancellation value (the "Yes" branch in #11), processing returns to step #02. That is to say, when no voltage drop warning has been disposed in the current situation, even if the amount of voltage drop is greater than the cancellation value, it is not greater than the permissible value, and therefore processing returns to step #02 without any change to see what happens afterwards. When a voltage drop warning has been issued in the current situation, it is determined that the amount of voltage drop has fallen below the permissible value, and the voltage drop has recovered to a level between the permissible value and the cancellation value, but the voltage drop has not yet recovered sufficiently to cancel the voltage drop warning. Therefore, the battery warning light 82 continues to flash, and processing returns to step #02 to see what happens afterwards.

If the content of the operation flag is "OFF" in the check in step #04 (the "OFF" branch in #04) or if the amount of voltage drop is no greater than the cancellation value in the check in step #11 (the "No" branch in #11), processing proceeds to step #21. In step #21, it is checked whether the content of the warning flag is "ON" or "OFF". This check in step #21 is a check regarding whether or not a voltage drop warning is currently active. If the content of the warning flag is "ON" (the "ON" branch in #21), "OFF" is set to the warning flag (#22) and the warning command serving as voltage drop information is cancelled (#23). In response to the cancellation of the warning command, the display controller 75 stops the battery warning light 82 from flashing and turns it off (#24). Thereafter, processing returns to step #02.

If the content of the warning flag is "OFF" in the check in step #21 (the "OFF" branch in #21), processing returns to step #02.

In this flowchart, if the amount of voltage drop is greater than the permissible value in the check in step #05, the voltage drop manager 73 immediately performs voltage drop warning processing (#06, #07, #08). However, in this step #05, timer processing may be performed so that voltage drop warning processing is only performed when the amount of voltage drop continuously exceeds the permissible value for a predetermined period of time.

The detection and reporting of a voltage drop according to the above-described preferred embodiment of the present invention is particularly advantageous because the engine speed is kept low and because the operation of the operating apparatus W1 and the external device W2 and the damage to the battery 6 caused by overdischarge can be taken into account when the amount of power generated by the alternator A is low or the capacity of the battery 6 is low. For example, a preferred embodiment of the present invention is effective when snow removal work is carried out late at night, as such work is carried out at a low engine speed in order to avoid noise. Preferred embodiments of the present invention are effective not only in snow removal, but also in work in low temperature conditions, as the output characteristics of the battery 6 are more likely to deteriorate in such conditions. Preferred embodiments of the present invention are also effective at a campsite or the like when electrical devices for camping, such as lamps, are connected to the external power feed port 61 when the engine E is stopped.

Other Preferred Embodiments (1) The division of the functional units in the functional block diagram shown in FIG. 4 is an example for clarity of description, and several functional units may be integrated or a single functional unit may be divided into a plurality of units. For example, the voltage detector 71 and the voltage drop amount detector 72 may be integrated, or yet another functional unit may be added. In addition, the voltage detector 71 may be replaced with a functional unit that detects a current and calculates a battery voltage drop as a result.

(2) The arrangement of the electrical components shown in FIGS. 2 and 3 is an example, and, for example, the alternator A may be disposed on a rear portion of the engine E. The electronic control unit 7 may also be disposed inside the front panel or rearward of the driver's seat 11. In addition, the power feed line 60 may be wired in accordance with the layout of the components mounted on the body 1.

(3) In the above-described preferred embodiments, the voltage drop warning light 8a that is also used as the battery warning light 82 is used as a reporting device that reports a battery voltage drop. However, an independent warning light may be used. In addition, together with the voltage drop warning light 8a or instead of the voltage drop warning light 8a, a loudspeaker or buzzer for reporting voltage drop information by voice, a display for reporting voltage drop information by displaying a message, or the like may be used as a reporting device.

(4) In the above-described preferred embodiments, voltage drop information is reported when the amount of voltage drop in the battery 6 is greater than the permissible value during the operation of the operating apparatus W1 or the external device W2. However, voltage drop information may be reported when the operating apparatus W1 or the external device W2 is not in operation. In such a case, it is preferable that the reporting modes can be distinguished between when the operating apparatus W1 is in operation and when it is not in operation. Although an operation flag is included in #04 in the processing flow as shown in FIG. 6, this check does not necessarily need to be performed. In other words, the processing flow may start with the detection of voltage fluctuations and the calculation of the amount of voltage drop.

(5) The arrangement of the components around the driver's section 9 and the driver's seat 11 described in the above preferred embodiments with reference to FIG. 2, such as the panel, the levers, and the pedals, is an example, and the present invention is not limited to such components or the arrangement thereof.

(6) In the above-described preferred embodiments, a tractor, which is a work vehicle, is described as an example, but the work apparatus may be a work vehicle other than a tractor, i.e., a rice transplanter, a combine harvester, a construction machine, a lawnmower, or a work vehicle for civil engineering work, forest work, snow removal work, etc.

(7) As shown in FIGS. 4 and 6, the above preferred embodiments describe an apparatus including the operating apparatus manager 74, an apparatus that performs operating apparatus management processing, and an apparatus that performs a processing flow that involves an operation flag is in #04 in FIG. 6. However, the operating apparatus manager 74 or the operating apparatus management processing may be omitted. That is to say, the apparatus need only be able to detect voltage fluctuations or calculate the amount of voltage drop, and issue a voltage drop warning based on the detection or the calculation, without detecting the state of the operating apparatus W1.

(8) The above preferred embodiments describe the fact that a general-purpose electric device can be connected to the external power feed port 61 and used as the external device W2. However, for example, a lamp, an air conditioner, a defogger, etc. may be additionally connected thereto.

(9) In addition, as a component related to the alternator A, a protective member having a fuse function for current protection, which protects the alternator A from abnormal current, may be disposed in the power supply path. The protective member protects the alternator A by being blown when an abnormal current is input thereto. With regards to faults such as the blowing of the protective member and the disconnection of a cable connected to the alternator A, it is very likely that the driver will not notice them until the battery 6 is dead (the capacity of the battery 6 runs out) if a fault detection function is not provided. However, preferred embodiments of the present invention are effective because they allow the driver to know the situation of a voltage drop before the battery 6 is dead and to avoid any disadvantages for the driver caused by the dead battery. There are a number of inconveniences for the driver caused by a dead battery. Examples of inconveniences include the inability to continue work due to sudden engine failure during night work, increased battery replacement costs due to degraded battery performance as a result of running out of the capacity, delays due to the inability to perform scheduled work, and the preparation and inconvenience of restarting.

(10) The above preferred embodiments show, as the operating apparatus W1 or the external device W2, an apparatus that is disposed rearward of the body 1 and that requires power supply, examples of which include an implement of any kind, such as a rotary, an electric implement including a motor, a water supply apparatus, and a fertilizer supply apparatus. However, the operating apparatus W1 and the external device W2 are not limited to these examples. Furthermore, it is provided that the operating apparatus W1 and the external device W2 are used even when the work vehicle is travelling at a low speed or is stopped, and therefore when the work vehicle is travelling at a low speed or is stopped, the rotational speed of the engine E decreases and the output of the alternator A decreases accordingly. Preferred embodiments of the present invention are also effective under such circumstances.

(11) That is to say, preferred embodiments of the present invention is effective when the battery voltage decreases due to a combination of a decrease in the output characteristics of the battery at low temperature, a decrease in the output of the alternator A due to a low speed of the engine E, an increase in the power consumption of various implements, and an increase in the power consumption due to the use of electrical components. Furthermore, as described above, even in the event of a malfunction of the alternator A or components related to the alternator A, the driver can be informed of the malfunction before the battery runs out.

(12) A preferred embodiment of the present invention may be embodied as a program that enables a computer to realize the functions of the components in the above preferred embodiments. Alternatively, a preferred embodiment of the present invention may be embodied as a non-transitory recording medium having recorded thereon a program that enables a computer to realize the functions of the components in the above preferred embodiments. Alternatively, a preferred embodiment of the present invention may be embodied as a method of carrying out by one or more steps what is done by the components in the above preferred embodiments.

Note that the configurations disclosed in the above preferred embodiments (including modified preferred embodiments, the same applies hereinafter) may be used in combination with configurations disclosed in Other Preferred Embodiments as long as there is no inconsistency. The preferred embodiments disclosed in the present specification are examples, and preferred embodiments of the present invention are not limited thereto, and may be modified as appropriate without departing from the scope of the present invention.

Preferred embodiments of the present invention are applicable to work vehicles each including a battery.

Furthermore, preferred embodiments of the present invention are applicable to programs, non-transitory recording media, and methods for operating work vehicles each including a battery.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A work vehicle comprising:
a battery;
an operating apparatus to be supplied with power from the battery;
a reporting device in a driver's section;
a voltage drop amount detector to detect an amount of voltage drop in the battery; and
a voltage drop manager to report voltage drop information via the reporting device in response to the amount of voltage drop exceeding a permissible value during operation of the operating apparatus; wherein
the voltage drop manager cancels the reporting of the voltage drop information via the reporting device when it is detected that the operating apparatus is not operated.

2. The work vehicle according to claim 1, wherein the voltage drop amount detector is in an electronic control unit to be supplied power from the battery and is operable to detect the amount of voltage drop based on a detection signal from a voltage detector connected to a power feed line of the battery.

3. The work vehicle according to claim 1, wherein
the reporting device includes a single voltage drop warning light; and
the voltage drop information is reported by flashing of the voltage drop warning light.

4. The work vehicle according to claim 3, further comprising:
a battery warning light on an instrument panel in the driver's section; and
the battery warning light is usable as the voltage drop warning light.

5. The work vehicle according to claim 1, wherein the voltage drop manager is operable to report the voltage drop information in response to the amount of voltage drop continuously exceeding the permissible value for a predetermined period of time.

6. The work vehicle according to claim 1, wherein the reporting of the voltage drop information is cancelled in response to the amount of voltage drop returning to a cancellation value less than the permissible value.

7. The work vehicle according to claim 1, wherein the operating apparatus is operable on power supplied by the battery.

8. The work vehicle according to claim 1, further comprising:
an operating apparatus manager to manage operation of the operating apparatus.

9. The work vehicle according to claim 1, further comprising:
an external power feed port connected to the battery.

10. The work vehicle according to claim 1, wherein the operating apparatus includes a motor operable on power supplied by the battery.

11. The work vehicle according to claim 1, wherein the operating apparatus is operable when the work vehicle is stopped and when the work vehicle is travelling at low speed.

12. The work vehicle according to claim 1, further comprising:
an alternator to supply power to the battery and the operating apparatus via a cable and including a current protector in a power supply path; wherein
a voltage drop warning light defining and functioning as the reporting device is operable to issue a warning in response to an abnormality occurring in the cable or the current protector.

13. A non-transitory recording medium having recorded thereon a program for a work vehicle including a battery, an operating apparatus to be supplied with power from the battery, and a reporting device in a driver's section, the program enabling a computer to realize:
- a voltage drop amount detecting function of detecting an amount of voltage drop in the battery; and
- a voltage drop managing function of reporting voltage drop information via the reporting device in response to the amount of voltage drop exceeding a permissible value during operation of the operating apparatus, and cancelling the reporting of the voltage drop information via the reporting device when it is detected that the operating apparatus is not operated.

14. A method for a work vehicle including a battery, an operating apparatus to be supplied with power from the battery, and a reporting device in a driver's section, the method comprising:
- detecting an amount of voltage drop in the battery;
- reporting voltage drop information via the reporting device in response to the amount of voltage drop exceeding a permissible value during operation of the operating apparatus; and
- cancelling the reporting of the voltage drop information via the reporting device when it is detected that the operating apparatus is not operated.

\* \* \* \* \*